(12) United States Patent
Hashimoto et al.

(10) Patent No.: US 6,444,309 B1
(45) Date of Patent: Sep. 3, 2002

(54) PRESSURE-SENSITIVE ADHESIVE FABRIC TAPE FOR WIRE HARNESS BUNDLING

(75) Inventors: Katsumi Hashimoto; Hiroyuki Iwamura; Noriyoshi Bitoh, all of Kawasaki (JP)

(73) Assignee: Sliontec Corporation, Kanagawa (JP)

( * ) Notice: Subject to any disclaimer, the term of this patent is extended or adjusted under 35 U.S.C. 154(b) by 0 days.

(21) Appl. No.: 09/463,218

(22) PCT Filed: May 26, 1999

(86) PCT No.: PCT/JP99/02780

§ 371 (c)(1),
(2), (4) Date: Jan. 21, 2000

(87) PCT Pub. No.: WO99/61541

PCT Pub. Date: Dec. 2, 1999

(30) Foreign Application Priority Data

May 27, 1998 (JP) ............................................. 10-145635

(51) Int. Cl.[7] ............................... B32B 7/12; B32B 5/02
(52) U.S. Cl. ....................... 428/352; 428/343; 428/354; 428/355; 428/356; 428/131; 428/134; 428/137; 442/149; 442/150; 442/151
(58) Field of Search ................................. 428/352, 356, 428/354, 343, 355, 131, 134, 137; 442/151, 149–152

(56) References Cited

U.S. PATENT DOCUMENTS 4,896,440 A * 1/1990 Salaverria .................... 36/115
4,937,111 A * 6/1990 Fontanilla .................. 428/34.1
5,660,660 A * 8/1997 Greuel, Jr. et al. ........... 156/85
6,200,677 B1 * 3/2001 Richardson et al. ........ 428/343

FOREIGN PATENT DOCUMENTS

| JP | 253950 | 4/1990 |
| JP | 4643 | 1/1992 |
| JP | A-6494222 | 2/1994 |
| JP | A-8302296 | 11/1996 |
| JP | A-9137133 | 5/1997 |
| JP | A-9176581 | 7/1997 |
| JP | A-9221614 | 8/1997 |

OTHER PUBLICATIONS

Translation of JP– 02 53950, Kobayashi, "Noise Generation–Preventing Adhesive Tape", Apr. 18, 1990.*

* cited by examiner

Primary Examiner—Terrel Morris
Assistant Examiner—Hai Vo
(74) Attorney, Agent, or Firm—Birch, Stewart, Kolasch & Birch, LLP

(57) ABSTRACT

The present invention relates to a cloth adhesive tape for binding a wire harness used for binding the insulated conductors of wire harness. An adhesive layer 12 is put on the one surface of substrate 11 made of a non-woven fabric and having small through holes 15 throughout the area thereof, and a resin layer 13 is put on the other surface of the substrate 11, and a release agent layer 14 is put on the resin layer 13. This can prevent the delamination of the substrate 11 and can improve a sound-damping property, a hand-tearing property, and a fire resistance.

14 Claims, 1 Drawing Sheet

PRESSURE-SENSITIVE ADHESIVE FABRIC TAPE FOR WIRE HARNESS BUNDLING

This application is the national phase under 35 U.S.C. § 371 of PCT International Application No. PCT/JP99/02780 which has an International filing date of May 26, 1999, which designated the United States of America.

FIELD OF THE INVENTION

The present Invention relates to a cloth adhesive tape for binding a wire harness used for binding the insulated conductors of a wire harness, and in particular, a cloth adhesive tape for binding a wire harness, which does not contain any halogen element and has good characteristics of a sound-damping property, a hand-tearing property, a fire resistance and the like and does not cause a delamination in a substrate and is manufactured at low cost. Here, the sound-damping property means a property of damping sounds produced when substances are put into contact with each other, and the hand-tearing property means a property of being torn or broken in a vertical direction or in a slanting direction with respect to the direction of the length of the adhesive tape by the tensile stress caused by hands. Also, the delamination means a phenomenon that a substrate of the adhesive tape is separated into two layers of an adhesive layer side and a resin layer side when the adhesive tape reel in multiple turns is unwound. The adhesive tape causing the delamination in a wide range can not be used for a true purpose.

BACKGROUND ART

An adhesive tape having a substrate made of polyvinyl chloride has mainly been used as an adhesive tape for binding a wire harness. Also, an adhesive tape having a substrate made of a cotton cloth or an acetate cloth has been used to reduce tapping noises or friction noises produced by the wire harness from the viewpoint of improving the cabin comfort of a car.

The adhesive tape having a substrate made of polyvinyl chloride is inexpensive, but when it is burned, it is apt to generate dioxin and hence sometimes presents an environmental problem. Also, when the adhesive tape having a substrate made of polyvinyl chloride is used for binding the wire harness, it can produce good workability but it can not satisfactorily prevent noises such as tapping noises, friction noises or the like.

Also, an adhesive tape having a substrate made of a cotton cloth or an acetate cloth, which is disclosed in Japanese Utility Model Laid-Open No. 4-643, can prevent noises such as tapping noises, friction noises or the like, but it is expensive.

Also, an adhesive tape having a substrate made of a non-woven fabric, which is disclosed in Japanese Utility Model Laid-Open No. 2-53950, is not expensive and has an effect of preventing noises such as tapping noises, friction noises or the like, but it is apt to cause a delamination when the adhesive tape reel in multiple turns is unwound.

As described above, the conventional technologies have not been capable of producing an adhesive tape for binding a wire harness, which does not contain any halogen element and is excellent in a sound-damping property, a hand-tearing property and a fire resistance and does not cause a delamination in the substrate and is manufactured at low cost.

The present invention has been made to solve the above problems. It is an object of the present invention to provide an adhesive tape for binding a wire harness, which does not contain any halogen element and is excellent in sound-damping property, hand-tearing property and fire resistance and does not cause a delamination in the substrate and is manufactured at low cost.

DISCLOSURE OF THE INVENTION

In order to accomplish the object described above, a cloth adhesive tape for binding a wire harness in accordance with the present invention includes an adhesive layer put on the one surface of the substrate made of a non-woven fabric having small through holes throughout the area thereof, a resin layer put on the surface of the substrate opposite to the surface provided with the adhesive layer, and a release agent layer put on the resin layer.

In this case, for example, a cotton non-woven fabric having a thickness of 0.2 mm to 0.6 mm and containing no binder is used as the non-woven fabric. The non-woven fabric like this has impact relaxing property because its thickness is not less than 0.2 mm, and is easy to use because its thickness is not more than 0.6 mm and hence is easily torn by hands. The use of this non-woven fabric as a substrate makes it possible to manufacture an adhesive tape for binding a wire harness having a good sound-damping property and a good hand-tearing property and can reduce the total cost of the adhesive tape because the substrate is not expensive.

Also, in this case, the delamination of the substrate (that is, non-woven fabric) can be prevented by making small through holes in the whole area of the non-woven fabric. The reason why the through holes prevent the delamination of the non-woven fabric is that when resin such as polyethylene is laminated on the non-woven fabric to reinforce the non-woven fabric, the resin such as polyethylene gets into the through holes to reinforce the portions near the through holes of the non-woven fabric. That is, even if the non-woven fabric causes the delamination, the delamination is caused only near the peripheral portions of the through holes reinforced particularly in this manner and is not caused in the wide range of the non-woven fabric.

Also, it is preferable that the diameter of the aperture of the through holes on the surface of the non-woven fabric described above is 0.5 mm to 2 mm. If the diameter of the aperture is not more than 0.5 mm, the resin slightly gets into the through holes and does not reinforce the non-woven fabric. Also, if the diameter of the aperture is not less than 2 mm, there is a portion where a distance between the apertures is not less than 2 mm and the non-woven fabric is not sufficiently reinforced at the portion. Therefore, there is a danger in both the cases that the delamination is caused. Further, it is preferable that the total area of the apertures of the through holes described above is 10% to 35% of the surface area of the non-woven fabric described above. If the total area of the apertures of the through holes described above is less than 10% of the surface area of the non-woven fabric, the non-woven fabric is not sufficiently reinforced, and if the total area of the apertures of the through holes described above is more than 35% of the surface area of the non-woven fabric, the ratio of the non-woven fabric to the whole area of the tape is made small, which reduces a sound-damping effect. Since the area of the aperture of one through holes is not more than 3.2 $mm^2$ under this condition, there is on the average one or more through holes per 32 $mm^2$ of the surface area of the non-woven fabric described above. Further, the shape of the aperture of the through hole is not particularly limited to a circle.

Furthermore, in this case, since the release agent layer described above is between the adhesive layer and the resin layer when the adhesive tape is wound many turns, when the adhesive tape is unwound, the release agent layer is easily peeled off from the adhesive layer with the resin layer to prevent the delamination.

Also, in this case, the adhesive layer is made by applying an adhesive composition containing, for example, cis-1, 4-polyisoprene as a base material and a flame retardant or a fire resistant agent containing no halogen element on the substrate. Natural rubber (cis-1, 4-polyisoprene derived from plants) or synthetic cis-1, 4-polyisoprene or a mixture of both of them is used as the cis-1, 4-polyisoprene. The adhesive layer like this does not contain halogen element and hence does not generate dioxin when it is burned.

Also, in this case, for example, a polyethylene layer having a thickness of 10 $\mu$m to 45 $\mu$m is used as the resin layer. Such a polyethylene layer has a thickness of 10 $\mu$m or more and hence can reinforce the non-woven fabric sufficiently. Also, the polyethylene layer has a thickness of 45 $\mu$m or less and hence does not impair the hand-tearing property of the tape.

Also, in this case, the resin layer may be made of a polyethylene layer colored black by carbon black and embossed and having a thickness of 10 $\mu$m to 45 $\mu$m. If an adhesive tape provided with such a polyethylene layer in accordance with the present invention is used for binding a wire harness, it can make the wire harness inconspicuous.

BEST MODE FOR CARRYING OUT THE INVENTION

Figure 1:
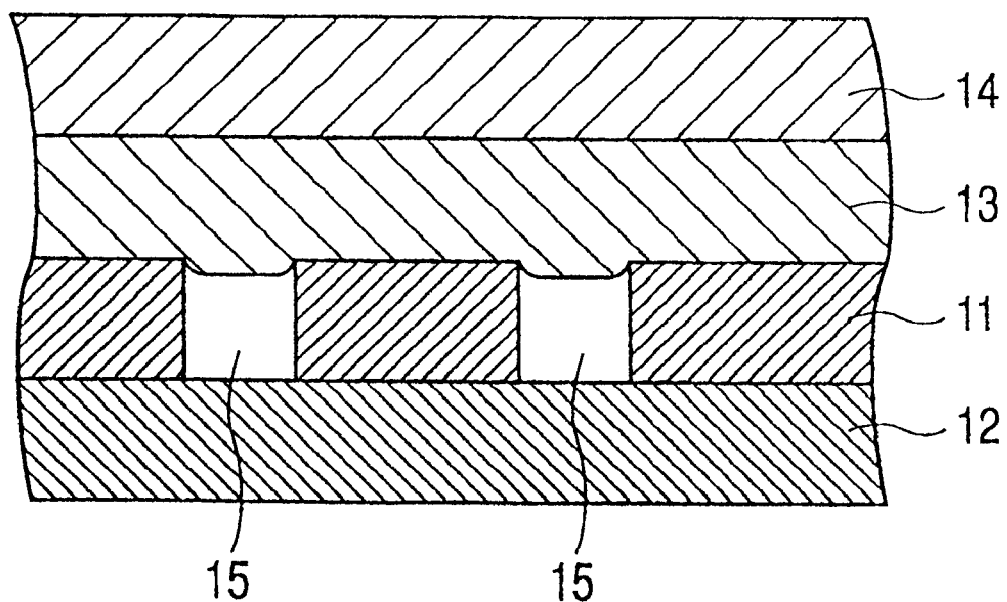
FIG. 1 is a schematic cross-sectional view showing a part of a cloth adhesive tape for binding a wire harness in accordance with the present invention.

FIG. 1 is a schematic cross-sectional view showing a part of a cloth adhesive tape for binding a wire harness in accordance with the present invention. As shown in FIG. 1, an adhesive layer 12 is provided on one surface of a substrate 11 made of a non-woven fabric having small through holes 15 throughout the area thereof, and a resin layer 13 is put on the surface opposite to the surface provided with the adhesive layer 12 of the substrate 11, and a release agent layer 14 is put on the resin layer 13.

In this cloth adhesive tape for binding a wire harness, the substrate 11 is made of the non-woven fabric and hence is good in sound-damping property and is less expensive than an adhesive tape made of a cotton cloth.

Also, in contrast to an adhesive tape whose substrate is made of polyvinyl chloride, when this cloth adhesive tape is burned, it does not generate dioxin.

Also, in this cloth adhesive tape for binding a wire harness, since the resin layer 13 is put on the surface opposite to the surface provided with the adhesive layer 12 of the substrate 11 and the release agent layer 14 is put on the resin layer 13, the cloth adhesive tape for binding a wire harness can easily be unwound and hence is excellent in workability.

Also, in this cloth adhesive tape for binding a wire harness, since the non-woven fabric has small through holes throughout the area thereof, when the cloth adhesive tape reel in multiple turns is unwound, the non-woven fabric used as the substrate does not cause a delamination.

Also, in this cloth adhesive tape for binding a wire harness, since the adhesive layer 12 is used to which, for example, an adhesive composition having a base material made of a natural rubber having a flame retardant or a fire resistant agent added thereto or a synthetic isoprene rubber or a mixture of both the rubbers is applied, the cloth adhesive tape resists burning and does not generate dioxin when it burns.

Also, in this cloth adhesive tape for binding a wire harness, if the resin layer 13 put on the substrate 11 is colored black and is embossed, it prevents the reflection of light to produce an advantage that the wire harness bound by this tape is made inconspicuous.

(Preferred Embodiment 1)

A composition containing 100 parts by weight of natural rubber, 100 parts by weight of tackifire, 200 parts by weight of calcium bicarbonate, 30 parts by weight of process oil, 2 parts by weight of antiaging agent, 100 parts by weight of fire resistant agent was kneaded with a kneader to make an adhesive composition.

Next, a resin layer 13 was put on the one surface of a substrate 11 made of a cotton non-woven fablic having small through holes 15 throughout the area thereof, and a release agent layer 14 was put on the resin layer 13, and the adhesive composition was applied to the other surface of the substrate 11 in a thickness of about 0.2 mm to make an adhesive layer 12. In this manner, a cloth adhesive tape for binding a wire harness was manufactured. This cloth adhesive tape for binding a wire harness did not cause a delamination even when it was unwound.

(Preferred Embodiment 2)

A composition containing 100 parts by weight of synthetic cis-1, 4-isoprene rubber, 100 parts by weight of tackifire, 200 parts by weight of calcium bicarbonate, 30 parts by weight of process oil, 2 parts by weight of antiaging agent, 100 parts by weight of fire resistant agent was kneaded with a kneader to make an adhesive composition. Next, a resin layer 13 was put on the one surface of a substrate 11 made of a cotton non-woven fabric having small through holes 15 throughout the area thereof, and a release agent layer 14 was put on the resin layer 13, and the adhesive composition was applied to the other surface of the substrate 11 in a thickness of about 0.2 mm to make an adhesive layer 12. In this manner, a cloth adhesive tape for binding a wire harness was manufactured.

COMPARATIVE EXAMPLE 1

A composition containing 100 parts by weight of natural rubber, 100 parts by weight of tackifire, 200 parts by weight of calcium bicarbonate, 30 parts by weight of process oil, 2 parts by weight of antiaging agent, 100 parts by weight of fire resistant agent was kneaded with a kneader to make an adhesive composition.

Next, a resin layer 13 was put on the one surface of a substrate 11 made of a cotton non-woven fabric (however, having no through holes 15, in this case) and a release agent layer 14 was put on the resin layer 13, and adhesive composition was applied to the other surface of the substrate 11 in a thickness of about 0.2 mm to make an adhesive layer 12. In his manner, a cloth adhesive tape for binding a wire harness was manufactured.

This cloth adhesive tape for binding a wire harness caused a delamination in the substrate 11 when it was unwound.

COMPARATIVE EXAMPLE 2

A composition containing 100 parts by weight of natural rubber, 100 parts by weight of tackifire, 200 parts by weight of calcium bicarbonate, 30 parts by weight of process oil, 2 parts by weight of antiaging agent, 100 parts by weight of fire resistant agent was kneaded with a kneader to make an adhesive composition.

Next, a resin layer 13 was put on the one surface of a substrate 11 made of a cotton (however, having no through holes 15, in this case) and a release agent layer 14 was put on the resin layer 13, and the adhesive composition was applied to the other surface of the substrate 11 in a thickness of about 0.11 mm to make an adhesive layer 12. In this manner, a cloth adhesive tape for binding a wire harness was manufactured.

Evaluations of the physical properties of the cloth adhesive tape for binding a wire harness were made for the preferred embodiment 1, the preferred embodiment 2, the comparative example 1, and the comparative example 2. In this case, JIS Z 0237 was employed as a method of making the evaluations of an adhesive strength of the physical properties. That is, a test piece having a width of 25 mm was pressed onto a test plate and then a force required to peel the test piece from the test plate at a speed of about 300 mm per minute was measured and the average of the force was made an adhesive strength. Also, a tack test was conducted according to JIS Z 0237 (Inclined-type ball tack method: balls having a diameter of $\frac{1}{32}$ to $\frac{32}{32}$ inches are used and test result is expressed by a ball number). That is, a test piece was put on a plate slanting at 30 degrees with an adhesive surface upward, and a polyester film for an approach run was put on a predetermined position of the adhesive surface of the test piece, and balls made of high carbon chrome bearing steel and having various sizes were rolled on the adhesive surface of the test piece with a approach run of 100 mm, and of the balls stopped in a measurement range of 100 mm long of the adhesive surface of the test piece, the ball having the maximum diameter was found. In this respect, a ball number is expressed by a number calculated by multiplying the diameter of the ball in inch by 32.

In comparison of the preferred embodiment 1, the preferred embodiment 2, the comparative example 1, and the comparative example 2 on the basis of the evaluation results shown in Table 1, while the preferred embodiment 1 and the preferred embodiment 2 produced the adhesive tapes having almost similar excellent performance, the comparative example 1 produced the adhesive tape causing a delamination and the comparative example 2 produced the adhesive tape high in price and low in adhesive characteristic. These evaluation results reveal the effect of the present invention.

TABLE 1

|  | Preferred Embodiment 1 | Preferred Embodiment 2 | Comparative Example 1 | Comparative Example 2 |
|---|---|---|---|---|
| Adhesive strength (gf/19 mm) | 750 | 720 | 750 | 380 |
| Tack (Ball No.) | 28 | 27 | 28 | 14 |
| Sound-damping property | good | good | good | good |
| Hand-tearing property | good | good | good | good |
| Price | low | low | low | high |
| Delamination | not caused | not caused | caused | not caused |

INDUSTRIAL APPLICABILITY

As described above, by putting the present invention into practice, an adhesive tape for binding a wire harness can be provided which does not contain any halogen element, which is one cause of producing dioxin when burned, and is excellent in characteristics such as a sound-damping property, a hand-tearing property, a fire resistance and the like, and does not cause a delamination in the substrate thereof and is manufactured at low cost.

What is claimed is:

1. A cloth adhesive tape for binding a wire harness, said tape comprising:
    a substrate made of a non-woven fabric having small through holes throughout an area thereof;
    an adhesive layer disposed on a top surface of the substrate;
    a resin layer disposed on a bottom surface of the substrate; and
    a release agent layer disposed on the resin layer.

2. A cloth adhesive tape for binding a wire harness as claimed in claim 1, wherein the diameter of an aperture of the through hole on the surface of the non-woven fabric is 0.5 mm to 2 mm and the total area of the apertures of the through holes is 10% to 35% of the surface area of a non-woven fabric.

3. A cloth adhesive tape for binding a wire harness as claimed in claim 2, wherein the substrate is made of a cotton non-woven fabric having a thickness of 0.2 mm to 0.6 mm.

4. A cloth adhesive tape for binding a wire harness as claimed in claim 1, wherein the substrate is made of a cotton non-woven fabric having a thickness of 0.2 mm to 0.6 mm.

5. A cloth adhesive tape for binding a wire harness as claimed in claim 1, wherein the adhesive layer contains cis-1,4-polyisoprene as a base and at least one agent added thereto, which is selected from the group consisting of a flame retardant containing no halogen element and a fire resistant agent containing no halogen element.

6. A cloth adhesive tape for binding a wire harness as claimed in claim 1, wherein the resin layer is a polyethylene layer having a thickness of 10 $\mu$m to 45 $\mu$m.

7. A cloth adhesive tape for binding a wire harness as claimed in claim 1, wherein the resin layer is a polyethylene layer colored black by carbon black and having a thickness of 10 $\mu$m to 45 $\mu$m, the polyethylene layer being embossed.

8. A cloth adhesive tape for binding a wire harness, said tape comprising:
    a substrate made of a non-woven fabric having small through holes throughout an area thereof;
    an adhesive layer disposed on a top surface of the substrate;
    a resin layer disposed on a bottom surface of the substrate; and infiltrating said through holes; and
    a release agent layer disposed on the resin layer.

9. A cloth adhesive tape for binding a wire harness as claimed in claim 8, wherein the diameter of an aperture of the through hole on the surface of the non-woven fabric is 0.5 mm to 2 mm and the total area of the apertures of the through holes is 10% to 35% of the surface area of a non-woven fabric.

10. A cloth adhesive tape for binding a wire harness as claimed in claim 8, wherein the substrate is made of a cotton non-woven fabric having a thickness of 0.2 mm to 0.6 mm.

11. A cloth adhesive tape for binding a wire harness as claimed in claim 8, wherein the adhesive layer contains cis-1, 4-polyisoprene as a base and at least one agent added thereto, which is selected from the group consisting of a flame retardant containing no halogen element and a fire resistant agent containing no halogen element.

12. A cloth adhesive tape for binding a wire harness as claimed in claim 8, wherein the resin layer is a polyethylene layer having a thickness of 10 $\mu$m to 45 $\mu$m.

13. A cloth adhesive tape for binding a wire harness as claimed in claim 8, wherein the resin layer is a polyethylene layer colored black by carbon black and having a thickness of 10 $\mu$m to 45 $\mu$m, the polyethylene layer being embossed.

14. A cloth adhesive tape for binding a wire harness as claimed in claim 8, wherein the substrate is made of a cotton non-woven fabric having a thickness of 0.2 mm to 0.6 mm.

* * * * *